US012325237B2

(12) United States Patent
Hatta et al.

(10) Patent No.: US 12,325,237 B2
(45) Date of Patent: Jun. 10, 2025

(54) LIQUID DISCHARGE HEAD AND LIQUID DISCHARGE APPARATUS

(71) Applicants: Chikako Hatta, Kanagawa (JP); Shinichiroh Osanai, Kanagawa (JP); Kohta Akiyama, Kanagawa (JP)

(72) Inventors: Chikako Hatta, Kanagawa (JP); Shinichiroh Osanai, Kanagawa (JP); Kohta Akiyama, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 199 days.

(21) Appl. No.: 18/205,572

(22) Filed: Jun. 5, 2023

(65) Prior Publication Data

US 2023/0398780 A1 Dec. 14, 2023

(30) Foreign Application Priority Data

Jun. 10, 2022 (JP) ................................ 2022-094326

(51) Int. Cl.
*B41J 2/14* (2006.01)

(52) U.S. Cl.
CPC .................................. *B41J 2/1433* (2013.01)

(58) Field of Classification Search
CPC ... B41J 2/1433; B41J 2/14274; B41J 2202/11
See application file for complete search history.

(56) References Cited

U.S. PATENT DOCUMENTS

2008/0239019 A1* 10/2008 Okazawa ............ B41J 2/14274 347/70
2018/0178538 A1 6/2018 Miyazawa et al.
2022/0371336 A1 11/2022 Mizutani et al.
2023/0040052 A1 2/2023 Hatta et al.

FOREIGN PATENT DOCUMENTS

JP 2014-240186 12/2014
JP 2018-103616 7/2018
JP 2018-158552 10/2018

* cited by examiner

*Primary Examiner* — Bradley W Thies
(74) *Attorney, Agent, or Firm* — XSENSUS LLP

(57) ABSTRACT

A liquid discharge head includes: a nozzle plate having multiple nozzle holes from which a liquid is to be discharged in a liquid discharge direction, the multiple nozzle holes arrayed in a nozzle array direction orthogonal to the liquid discharge direction; and a pressure chamber communicating with the multiple nozzle holes, wherein a volume $V_{min}$ of a virtual hemisphere S1 is $5\times10^5$ μm³ or more and $5\times10^6$ μm³ or less, and a volume $V_{max}$ of a virtual hemisphere S2 is five times or more and less than 1000 times the volume $V_{min}$, each of the multiple nozzle holes has a virtual center line, and the nozzle plate has an inner surface defining a wall of the pressure chamber, the inner surface having multiple openings of each of the multiple nozzle holes.

9 Claims, 9 Drawing Sheets

LIQUID DISCHARGE HEAD AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-094326, filed on Jun. 10, 2022, in the Japan Patent Office, the entire disclosure of which is hereby incorporated by reference herein.

BACKGROUND

Technical Field

The present embodiment relates to a liquid discharge head and a liquid discharge apparatus including the liquid discharge head.

Related Art

In a liquid discharge head provided in an inkjet type image forming apparatus, ink as a liquid is discharged from a nozzle hole to form an image.

In such a liquid discharge head, ink dries and thickens in the nozzle hole provided in a pressure chamber of the liquid discharge head and the vicinity thereof, so that clogging of the nozzle hole easily occurs. In particular, when quick-drying ink is used as ink, the nozzle hole is easily clogged.

SUMMARY

In an aspect of the present disclosure, a liquid discharge head includes: a nozzle plate having multiple nozzle holes from which a liquid is to be discharged in a liquid discharge direction, the multiple nozzle holes arrayed in a nozzle array direction orthogonal to the liquid discharge direction; and a pressure chamber communicating with the multiple nozzle holes, wherein a volume $V_{min}$ of a virtual hemisphere S1 is $5\times10^5$ μm$^3$ or more and $5\times10^6$ μm$^3$ or less, and a volume $V_{max}$ of a virtual hemisphere S2 is five times or more and less than 1000 times the volume $V_{min}$, each of the multiple nozzle holes has a virtual center line, the nozzle plate has an inner surface defining a wall of the pressure chamber, the inner surface having multiple openings of each of the multiple nozzle holes, a spherical center is at an intersection between the virtual center line and an extension surface extended from the inner surface over the multiple openings, the pressure chamber has surfaces: in both directions in the nozzle array direction from the spherical center; in a direction opposite to the liquid discharge direction from the spherical center; and in both directions orthogonal to the nozzle array direction and orthogonal to the liquid discharge direction from the spherical center, and the virtual hemisphere S1 has a radius $r_{min}$ centered in the spherical center, the radius $r_{min}$ having the shortest length from the spherical center to any one of the surfaces of the pressure chamber, and the virtual hemisphere S2 has a radius $r_{max}$ centered in the spherical center, the radius $r_{max}$ having the longest length from the spherical center to any one of the surfaces of the pressure chamber.

BRIEF DESCRIPTIONS OF DRAWINGS

A more complete appreciation of embodiments of the present disclosure and many of the attendant advantages and features thereof can be readily obtained and understood from the following detailed description with reference to the accompanying drawings, wherein.

Figure 1:
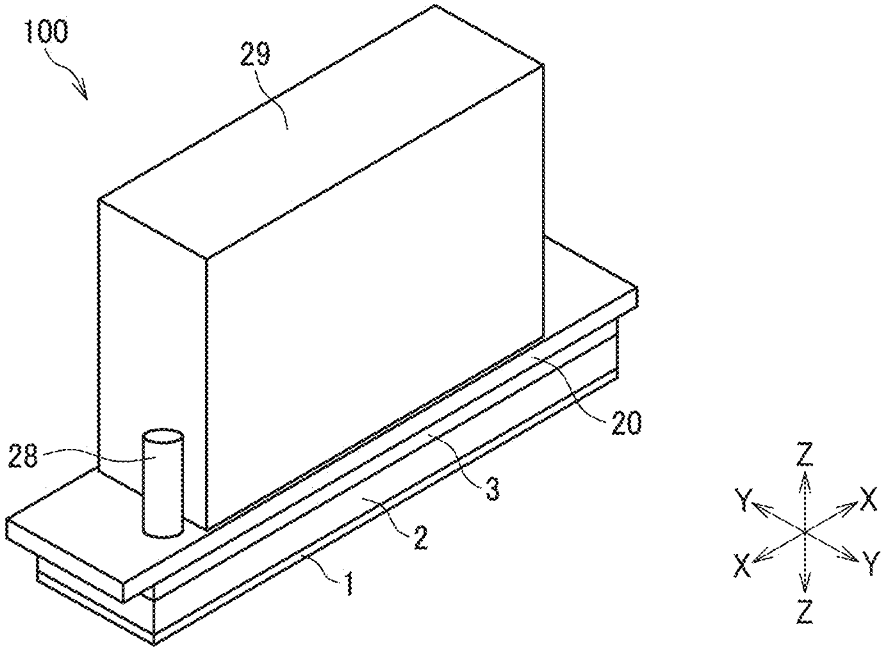
FIG. 1 is an external perspective view of a liquid discharge head according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an." and "the" are intended to include the plural forms as well, unless the context clearly indicates otherwise.

Figure 2:
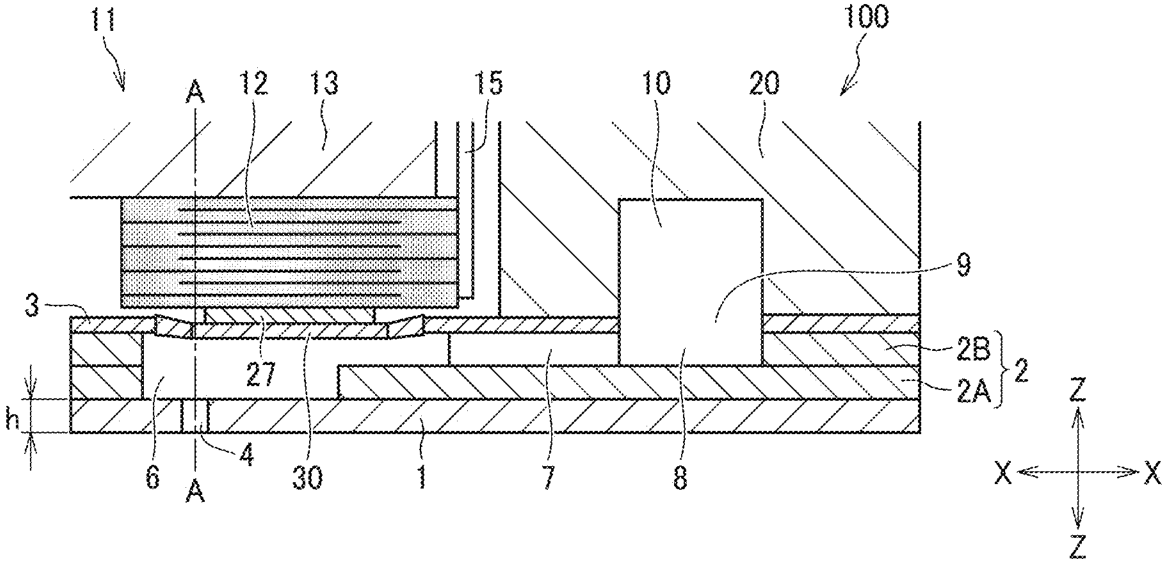
FIG. 2 is a cross-sectional view in a direction orthogonal to a nozzle array direction of the liquid discharge head.
Figure 3:
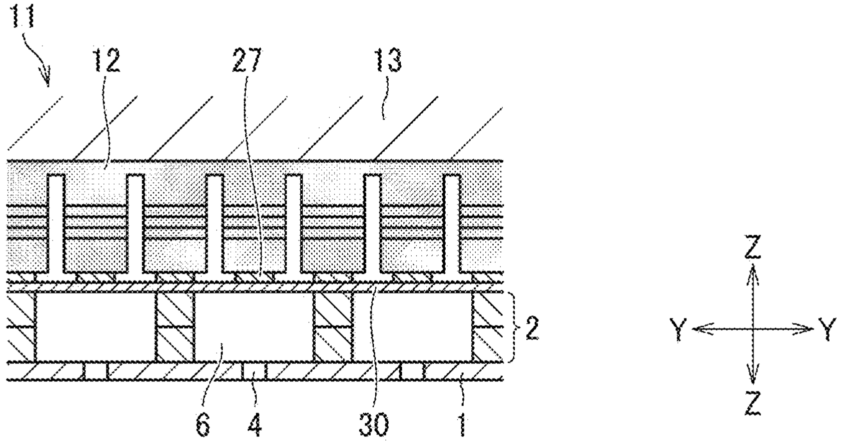
FIG. 3 is a cross-sectional view taken along line A-A in FIG. 2.

Hereinafter, the present embodiments will be described with reference to the accompanying drawings. A first embodiment of the present embodiment will be described with reference to FIGS. 1 to 3. FIG. 1 is an external perspective view of a liquid discharge head according to the first embodiment, FIG. 2 is a cross-sectional view in a longitudinal direction X of a pressure chamber of the liquid discharge head according to the embodiment, and FIG. 3 is a cross-sectional view in a nozzle array direction Y. The direction Y is an array direction of multiple nozzle holes 4, and is hereinafter also simply referred to as a nozzle array direction. A direction Z is a height direction of a pressure chamber 6, and is an opening direction of the nozzle hole, or a liquid discharge direction and an opposite direction thereof. The direction Z is also a vertical direction. The vertical direction is a direction of gravity and an opposite direction thereof in a state in which the liquid discharge head is used, and the direction in a state in which the liquid discharge head is used is, for example, a direction in a state in which the liquid discharge head is mounted to an apparatus such as a liquid discharge apparatus. The directions X, Y, and Z illustrated in FIG. 1 are directions orthogonal to one another. The direction X is a direction different from the nozzle array direction and the vertical direction among the directions orthogonal to one another. Note that, the direction X, which is the longitudinal direction of the pressure chamber 6, the direction Y, which is the nozzle array direction, and the direction Z, which is the liquid discharge direction, are not necessarily strictly perpendicular to one another, and there may be some error.

A liquid discharge head 100 of the present embodiment includes a nozzle plate 1, a channel plate 2 as an individual channel member, a diaphragm member 3 as a wall surface member, a piezoelectric actuator 11, a common chamber member 20, and a head cover 29. The nozzle plate 1, the channel plate 2, and the diaphragm member 3 are stacked to be bonded to one another. The piezoelectric actuator 11 displaces a deformable portion 30 of the diaphragm member 3. The head cover 29 also serves as a frame member of the liquid discharge head 100.

A piezoelectric element 12 and the like is arranged inside the common chamber member 20. As illustrated in FIG. 1, the head cover 29 is mounted to an upper portion of the common chamber member 20 and covers the piezoelectric element 12 and the like.

A supply port 28 supplies ink as a liquid to a common supply channel in the common chamber member 20.

As illustrated in FIGS. 2 and 3, the nozzle plate 1 includes multiple nozzle holes 4 that discharges ink.

The channel plate 2 and the diaphragm member 3 define a fluid resistor 7 and an intermediate supply channel 8. The nozzle plate 1, the channel plate 2, and the diaphragm member 3 define multiple pressure chambers 6. The pressure chamber 6 communicates with the nozzle hole 4. The fluid resistor 7 is an individual channel leading to each pressure chamber 6. The intermediate supply channel 8 is a liquid introducer communicating with one or multiple (one in the present embodiment) fluid resistors 7.

The diaphragm member 3 is formed of lamination of multiple plates, and is formed of lamination of two metal plates in the present embodiment. The diaphragm member 3 includes the deformable portion 30 facing the piezoelectric actuator 11.

The deformable portion 30 forms a part of a wall surface of the pressure chamber 6 and is elastically deformable by the piezoelectric actuator 11. The piezoelectric actuator 11 includes an electromechanical conversion element as a driver (actuator, pressure generator). The deformable portion 30 of the present embodiment is a portion in which the number of lamination of plates is smaller than that in another portion of the diaphragm member 3 and a length in a thickness direction is smaller than that in another portion. Specifically, the deformable portion 30 is formed of one metal plate. It is possible to make a cutting on the diaphragm member 3 to make the same partially deformable, and make a portion forming the wall surface of the pressure chamber 6 out of the deformable portion the deformable portion 30.

The piezoelectric actuator 11 includes a piezoelectric member bonded on a base 13. The piezoelectric member is groove-processed by half cut dicing so that each piezoelectric element 12 includes a desired number of pillar-shaped piezoelectric elements 12 that are arranged in certain intervals to have a comb shape in the nozzle array direction.

A support 27 that supports the deformable portion 30 is provided on the deformable portion 30. The piezoelectric element 12 is bonded to the support 27.

The piezoelectric element 12 is formed by alternate lamination of piezoelectric layers and internal electrodes. In the piezoelectric element 12, the internal electrodes are extracted from end faces so as to be connected to external electrodes (end face electrodes), and a flexible wiring member 15 is connected to the external electrodes.

The common chamber member 20 forms a common chamber 10 communicating with multiple pressure chambers 6. The common chamber 10 communicates with the intermediate supply channel 8 via an opening 9 provided on the diaphragm member 3, and communicates with the fluid resistor 7 via the intermediate supply channel 8.

Ink in the common chamber 10 is supplied to the pressure chamber 6 via the intermediate supply channel 8 and the fluid resistor 7. Ink in the pressure chamber 6 is discharged from the nozzle hole 4 out of the liquid discharge head 100. In the pressure chamber 6, an ink supply direction is a direction from the fluid resistor 7 side to the nozzle hole 4 side in the X direction.

In the liquid discharge head 100, for example, when lowering a voltage applied to the piezoelectric element 12 from a reference potential (intermediate potential), the piezoelectric element 12 contracts. Due to the contraction of the piezoelectric element 12, the deformable portion 30 is deformed toward the piezoelectric element 12, and a volume of the pressure chamber 6 is expanded, so that ink flows into the pressure chamber 6.

Thereafter, the voltage applied to the piezoelectric element 12 is increased to extend the piezoelectric element 12 in a lamination direction, so that the deformable portion 30 is deformed in the direction toward the nozzle hole 4 to contract the volume of the pressure chamber 6. As a result, the ink in the pressure chamber 6 is pressurized, and the ink is discharged from the nozzle hole 4.

The liquid discharge head 100 of the present embodiment is a non-circulation type liquid discharge head. In a circulation type liquid discharge head, ink flowing into the pressure chamber 6 is circulated via a circulation channel and the like and is allowed to flow into the pressure chamber 6 again, but in the non-circulation type liquid discharge head 100 of the present embodiment, such ink circulation is not performed. The pressure chamber 6 of the liquid discharge head 100 is provided with two openings of the nozzle hole 4 and the fluid resistor 7.

Figure 4A:
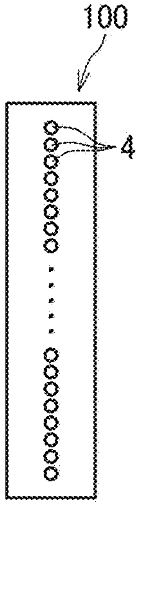
FIGS. 4A to 4D are bottom views of the liquid discharge head.
Figure 4B:
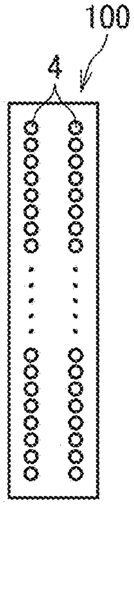
Figure 4C:
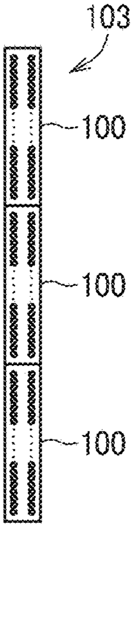
Figure 4D:
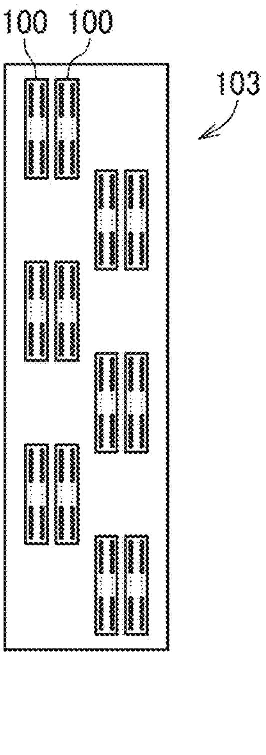

The liquid discharge head 100 may be formed to include one nozzle array in which the nozzle holes 4 are arrayed as illustrated in FIG. 4A, or may be formed to include multiple nozzle arrays as illustrated in FIG. 4B. The nozzle arrays may be arrayed in parallel as illustrated in FIG. 4B, or may be arrayed in a staggered manner. The head unit 103 may be formed of multiple arrayed liquid discharge heads 100 as illustrated in FIG. 4C. A pair of adjacent liquid discharge heads 100 may be arranged in a staggered manner in the head unit 103 as illustrated in FIG. 4D. There is no limitation, and an optimum arrangement of the nozzle holes 4 and the liquid discharge heads 100 may be appropriately selected.

Here, in the non-circulation type liquid discharge head as in the present embodiment, there has been a disadvantage that ink clogging in the nozzle hole occurs due to thickening or drying of ink in the nozzle hole and the vicinity thereof. Such a disadvantage is particularly noticeable when water-based pigment ink or quick-drying ink is used as the liquid used in the liquid discharge head.

Since the thickening due to drying of ink is diffused and spread from the ink in the vicinity of the nozzle, the larger the volume of the pressure chamber 6 around the nozzle hole is, the smaller the influence is. In contrast, there is a disadvantage that high-speed discharge cannot be supported because a meniscus resonance period becomes large when the pressure chamber 6 is made too large. Therefore, in the present embodiment, the size of the pressure chamber 6 is defined as follows.

Figure 5A:
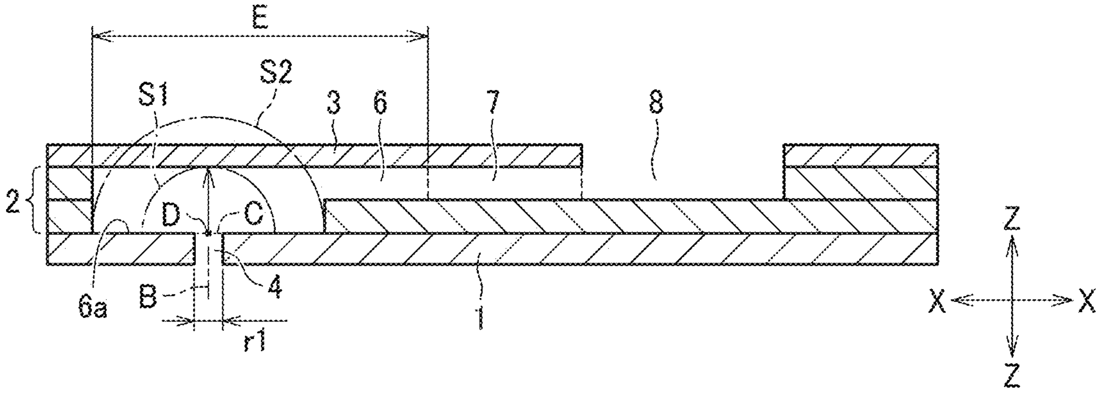
FIGS. 5A to 5B are cross-sectional views illustrating a virtual hemisphere and a virtual hemisphere of a pressure chamber of the liquid discharge head according to the present embodiment.

FIG. 5A illustrates a spherical center D, which is an intersection of a virtual center line B of the nozzle hole 4 and a virtual extended surface C of a surface 6*a* on which an opening end of the nozzle hole 4 is provided of the pressure chamber 6. A virtual hemisphere S1 and a virtual hemisphere S2 on the pressure chamber 6 side with the spherical center D as a center point are indicated by alternate long and short dash lines.

Figure 5B:
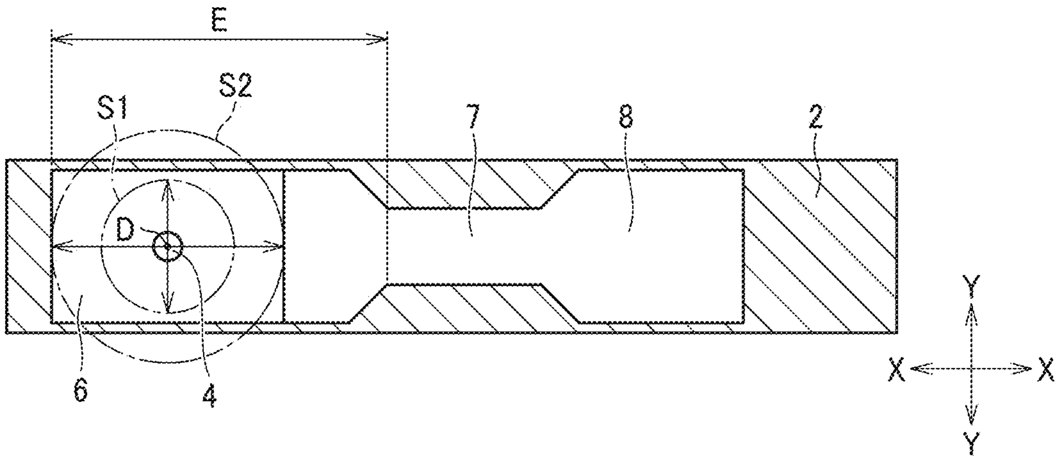

A length with which a distance to any surface of the pressure chamber 6 is the shortest is set to a radius $r_{min}$, and a length with which a distance to any surface of the pressure chamber 6 is the longest is set to a radius $r_{max}$ in a total of five directions including an upward direction in FIG. 5A being a height direction of the pressure chamber 6 from the spherical center D (or a direction opposite to the liquid discharge direction from the nozzle hole 4) as indicated by an arrow in FIG. 5A, and both directions in the Y direction (nozzle array direction) from the spherical center D and both directions in the X direction (the longitudinal direction of the pressure chamber, or a direction orthogonal to both the opposite direction of the liquid discharge direction from the nozzle hole 4 and the nozzle array direction) from the spherical center D as indicated by arrows in FIG. 5B. At that time, the virtual hemisphere S1 is a hemisphere on the pressure chamber side with the radius $r_{min}$ with the spherical center D as the center point. The virtual hemisphere S2 is a hemisphere on the pressure chamber side with the radius $r_{max}$ with the spherical center D as the center point. Here, "any surface of the pressure chamber 6" when obtaining the radius $r_{min}$ and the radius $r_{max}$ excludes the surface 6*a* on which the opening end of the nozzle hole 4 is provided. The virtual center line B of the nozzle hole 4 is a center line extending in a direction parallel to an extending direction of the nozzle hole 4.

Figure 6:
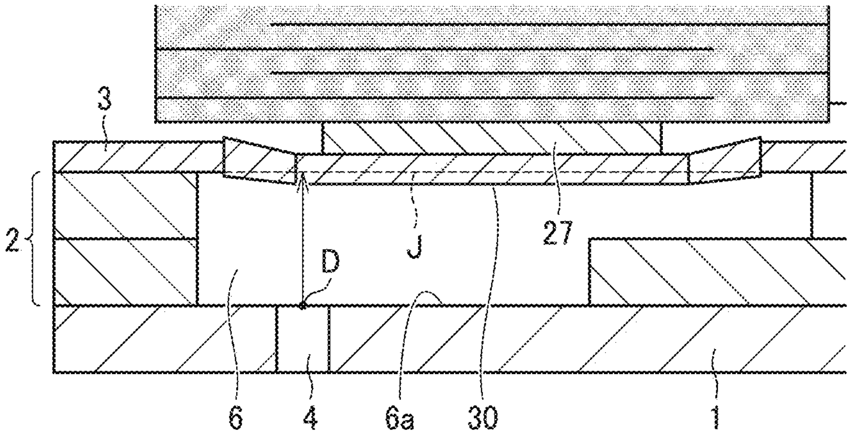
FIG. 6 is a diagram for explaining a distance in a height direction from a spherical center to an upper surface of a pressure chamber.

Here, the distance from the spherical center D to the upper surface of the pressure chamber 6 in the height direction of the pressure chamber 6 will be described in more detail. That is, when the deformable portion 30 of the diaphragm member 3 is provided at a position in the height direction of the pressure chamber 6 from the spherical center D as with the liquid discharge head of the present embodiment illustrated in FIG. 6, the position of the upper surface of the pressure chamber 6 changes depending on the state of the deformable portion 30. However, in this case, a surface obtained by extending a non-deformable portion of the pressure chamber 6 is defined as a virtual extended surface J, and the radius $r_{max}$ or $r_{min}$ described above is determined while setting a distance from the spherical center D to the virtual extended surface J as the distance from the spherical center D in the height direction of the pressure chamber 6. Alternatively, in a state in which the deformable portion 30 is not driven by the piezoelectric element 12 as a driver, the distance from the spherical center D to the deformable portion 30 may be set to the distance from the spherical center D in the height direction of the pressure chamber 6.

In the present embodiment, the pressure chamber 6 is provided in such a manner that a volume $V_{min}$ of the virtual hemisphere S1 is $5\times10^5$ $\mu m^3$ or more and $5\times10^6$ $\mu m^3$ or less and a volume $V_{max}$ of the virtual hemisphere S2 is five times or more and less than 1000 times the volume $V_{min}$ of the virtual hemisphere S1. By setting the volume $V_{min}$ of the virtual hemisphere S1 to $5\times10^5$ $\mu m^3$ or more and setting the volume $V_{max}$ of the virtual hemisphere S2 to five times or more the volume $V_{min}$ of the virtual hemisphere S1, a space having a certain extent or more from the spherical center D, which is the virtual center of the nozzle hole 4, is formed in the pressure chamber 6. Therefore, as described above, drying and thickening due to drying of the ink in the pressure chamber 6 may be suppressed, and clogging of the nozzle hole 4 may be suppressed. The number of times of dummy discharge for suppressing drying of the ink may be reduced. By setting the volume $V_{min}$ of the virtual hemisphere S1 to $5\times10^6$ $\mu m^3$ or less and setting the volume $V_{max}$ of the virtual hemisphere S2 to less than 1000 times the volume $V_{min}$ of the virtual hemisphere S1, the size of the pressure chamber 6 in the vicinity of the nozzle hole 4 may be suppressed to a certain value or less. As a result, the meniscus resonance period may be suppressed to a certain value or less.

As described above, in the present embodiment, by providing the pressure chamber 6 in the vicinity of the nozzle hole 4 with an appropriate size, it is possible to suppress the meniscus resonance period to a certain value or less while suppressing the drying and thickening due to drying of the ink in the pressure chamber, and the liquid discharge head may support high-speed discharge. As compared with the circulation type liquid discharge head, the above-described effect may be obtained with an inexpensive and simple configuration, and downsizing and cost reduction of the liquid discharge head may be implemented.

Figure 7A:
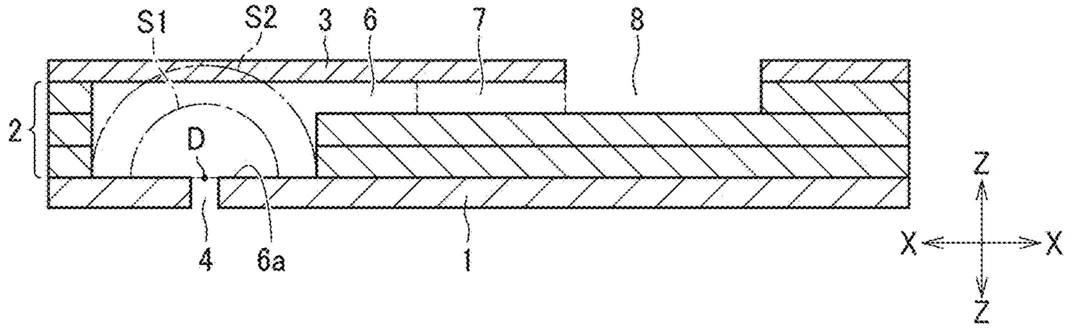
FIGS. 7A to 7B are cross-sectional views illustrating a virtual hemisphere and a virtual hemisphere of a pressure chamber of a liquid discharge head according to an embodiment different from that in FIGS. 5A to 5B.
Figure 7B:
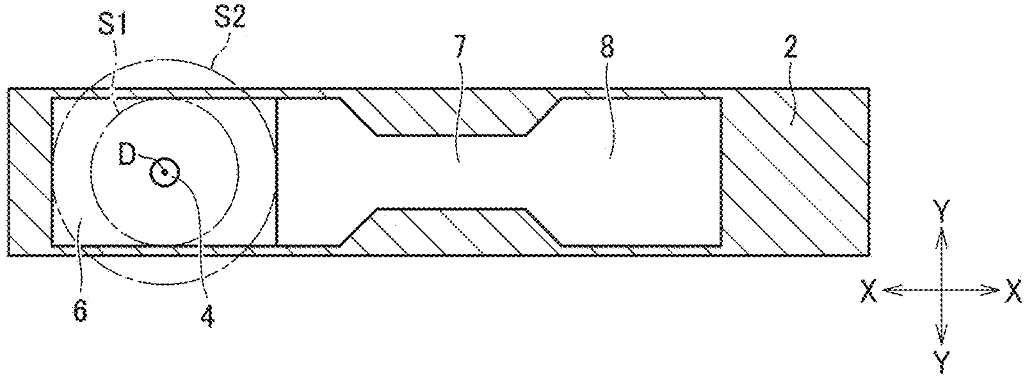

In the embodiment in FIGS. 5A to 5B, a case where the radius $r_{min}$ is the length in the direction Z of the pressure chamber 6 in the vicinity of the nozzle hole 4 from the spherical center D and the radius $r_{max}$ is the length in the longitudinal direction X in the vicinity of the nozzle hole 4 from the spherical center D, that is, a case where the length in the direction Z from the spherical center D to the wall surface of the pressure chamber 6 is the smallest and the length in the direction X from the spherical center D to the wall surface of the pressure chamber 6 is the largest has been described, but the present embodiment is not limited thereto. For example, in the pressure chamber 6 illustrated in FIGS. 7A and 7B, the length in the direction Y from the spherical center D is the smallest, and the length in the direction X is the largest. In this case also, it is possible to set the volume $V_{min}$ of the virtual hemisphere S1 and the volume $V_{max}$ of the virtual hemisphere S2 as described above to suppress the drying and thickening of the ink in the pressure chamber 6, and suppress the meniscus resonance period to a certain value or less.

Figure 8A:
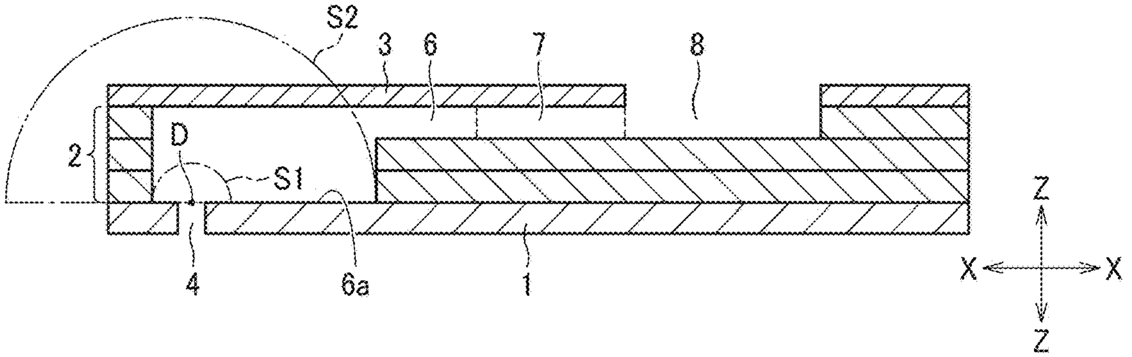
FIGS. 8A to 8B are cross-sectional views illustrating a virtual hemisphere and a virtual hemisphere of a pressure chamber of a liquid discharge head according to an embodiment different from that in FIGS. 5A to 5B and 7A to 7B.
Figure 8B:
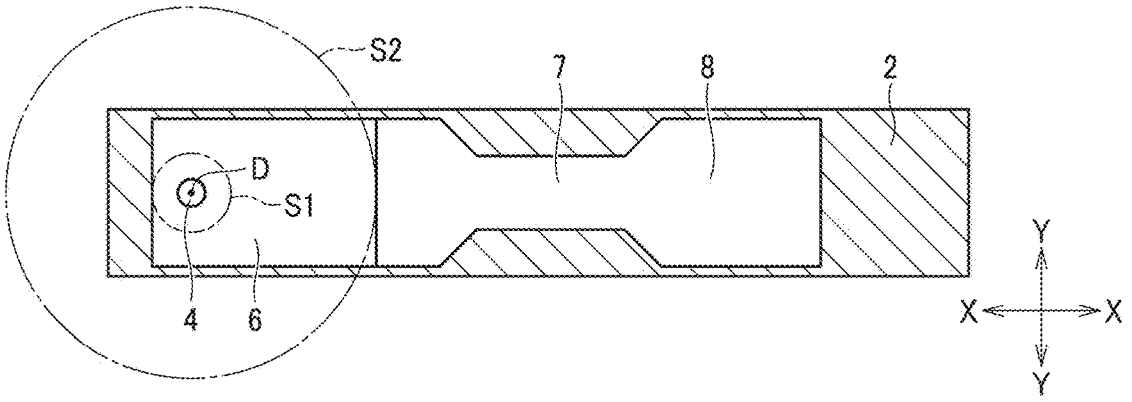

In the embodiment illustrated in FIGS. 8A and 8B, the nozzle hole 4 is arranged closer to one side in the direction X, so that the radius $r_{min}$ is a length on one side in the direction X, and the radius $r_{max}$ is a length on the other side in the direction X. In such an arrangement also, by setting the sizes of the virtual hemisphere S1 and the virtual hemisphere S2 as described above, the drying and thickening of the ink in the pressure chamber 6 may be suppressed, and the meniscus resonance period may be suppressed to a certain value or less.

As illustrated in FIG. 5A, assuming that the radius of the nozzle hole 4 is a radius r1, it is preferable that the radius $r_{min}$ of the virtual hemisphere S1 is set to three times or more and less than seven times the radius r1, and the radius $r_{max}$ of the virtual hemisphere S2 is set to five times or more and less than 60 times the radius r1. As a result, the size of the pressure chamber 6 in the vicinity of the nozzle hole 4 may be made an appropriate size with respect to the size of the nozzle hole 4 from which the ink is discharged, and drying and thickening of the ink in the nozzle hole 4 and the vicinity thereof may be suppressed while suppressing the meniscus resonance period to be small. Note that, the radius r1 of the nozzle hole 4 herein is a radius at a position at which the nozzle hole 4 is the thinnest (the cross section thereof is the smallest) at each position in an extending direction of the nozzle hole 4. The radius r1 is measured with a microscope using transmitted light.

An area A of the surface 6*a* on which the opening end of the nozzle hole 4 is provided of the pressure chamber 6 is preferably $5\times10^4$ μm$^2$ or more and $2\times10^5$ μm$^2$ or less. By setting the size of the pressure chamber 6 in the vicinity of the nozzle hole 4 to an appropriate size, it is possible to suppress drying and thickening of the ink in the nozzle hole 4 and the vicinity thereof while suppressing the meniscus resonance period to be small. In particular, the number of times of dummy discharge from the nozzle hole 4 may be reduced.

A volume V1 of the pressure chamber 6 is preferably 10 nl or less. As a result, the meniscus resonance period may be suppressed to be small. A range E illustrated in FIGS. 5A and 5B is a range of the pressure chamber 6, and a volume of a space up to a boundary with the fluid resistor 7 out of the space formed by the nozzle plate 1, the channel plate 2, the diaphragm member 3 and the like is the volume V1 of the pressure chamber 6. Note that, a hole portion of the nozzle hole 4 is not included, and the volume of the pressure chamber 6 is calculated with the extended surface C of the surface 6*a* as one surface. In other words, the volume of the pressure chamber 6 is the volume of the range E when the fluid resistor 7 and the nozzle hole 4 are filled. The fluid resistor 7 of the present embodiment is an ink passage that communicates with the pressure chamber 6 and has a smaller area of a cross section orthogonal to the longitudinal direction thereof than that of the pressure chamber 6 and the intermediate supply channel 8 on the ink supply side.

A thickness (thickness h in FIG. 2) of the nozzle plate 1 is preferably 25 μm or more and 45 μm or less. Therefore, a supply of an ink vehicle to the nozzle hole 4 may be promoted, and drying of the ink in the nozzle hole 4 and the vicinity thereof may be suppressed. This thickness may reduce the meniscus resonance period.

The area of the nozzle hole 4 is preferably 300 μm$^2$ or more and 360 μm$^2$ or less. By making the area of the nozzle hole 4 small, moisture is less likely to evaporate from the nozzle hole 4. Therefore, drying of the ink in the nozzle hole 4 and the vicinity thereof may be suppressed. The meniscus resonance period may be reduced. The area of the nozzle hole 4 is an area of a cross section orthogonal to the extending direction of the nozzle hole 4, the smallest cross-sectional area of the nozzle hole 4 at each position in the extending direction of the nozzle hole 4. This area is also measured using transmitted light with a microscope.

Experimental results of measuring the number of dummy discharges and a meniscus resonance period Tc for the liquid discharge head in four examples and four comparative examples in which parameters described above are changed will be described with reference to Table 1 below. The number of dummy discharge droplets is determined by the number of dummy discharge droplets required to prevent occurrence of missing nozzle after an image having a width of 27 inches and a dummy discharge portion at an end is continuously discharged on white paper and continuously discharged for 3.5 hours by an image forming apparatus. ⊙ indicates that the required number of dummy discharge droplets was one or two, ○ indicates that this was three or four, and x indicates that this was five or more. The meniscus resonance period Tc was set to less than 3.2 μs in ⊙ and 3.2 μs or more in x.

TABLE 1

| | Example 1 | Example 2 | Example 3 | Example 4 | Comparative Example 1 | Comparative Example 2 | Comparative Example 3 | Comparative Example 4 |
|---|---|---|---|---|---|---|---|---|
| Vmin [μm$^3$] | 1440000 | 1160000 | 910000 | 700000 | 180000 | 7240000 | 910000 | 910000 |
| Vmax/Vmin | 364.4 | 98.3 | 8 | 384.7 | 8000 | 15.6 | 37037 | 12703.7 |
| rmin/r1 | 6.7 | 6.2 | 5.7 | 5.2 | 3.2 | 9.2 | 4.6 | 5 |
| rmax/r1 | 47.6 | 28.6 | 11.4 | 38.1 | 63.6 | 23.1 | 153.8 | 116.7 |
| Area A [μm$^2$] | 78000 | 104000 | 16900 | 26000 | 104000 | 88400 | 222000 | 156000 |
| Pressure chamber volume V1 [μm$^3$] | 7.3 | 6.2 | 7 | 7.3 | 3.6 | 83.4 | 27.7 | 14.4 |
| Nozzle plate thickness [μm] | 30 | 35 | 40 | 43 | 50 | 80 | 60 | 70 |
| Nozzle hole area [μm$^2$] | 354 | 330 | 340 | 320 | 380 | 530 | 600 | 800 |
| Number of dummy discharges | ⊙ | ⊙ | ○ | ○ | X | ⊙ | ⊙ | ⊙ |
| Tc | ⊙ | ⊙ | ⊙ | ⊙ | ⊙ | X | X | X |

As illustrated in Table 1, in Examples 1 to 4, in particular, the volume $V_{min}$ of the virtual hemisphere S1 is set within the above-described range of $5\times10^5$ $\mu m^3$ or more and $5\times10^6$ $\mu m^3$ or less, and the value of $V_{max}/V_{min}$ is set within the range of 5 to 1000. On the other hand, in Comparative Examples 1 to 4, these values are out of the above-described ranges. As a result, in Examples 1 to 4, both the number of dummy discharges and the meniscus resonance period Tc were excellent, whereas in Comparative Examples 1 to 4, either the number of dummy discharges or the meniscus resonance period Tc was poor. More specifically, in Comparative Example 1 in which the volume $V_{min}$ of the virtual hemisphere S1 was small, the number of dummy discharges increased. In Comparative Examples 2 to 3 in which the values of $V_{min}$ and $V_{max}/V_{min}$ were large and the pressure chamber 6 was large, the meniscus resonance period was large. In this manner, by providing the volume $V_{min}$ and $V_{max}/V_{min}$ within an appropriate range as in Examples 1 to 4, it is possible to suppress drying and thickening due to drying of the ink in the pressure chamber 6 and to reduce the meniscus resonance period.

In the above-described embodiment, a case where the above-described configuration of the present embodiment is provided in the non-circulation type liquid discharge head has been exemplified, but there is no limitation, and the above-described configuration of the present embodiment may be provided in the circulation type liquid discharge head.

Figure 9:
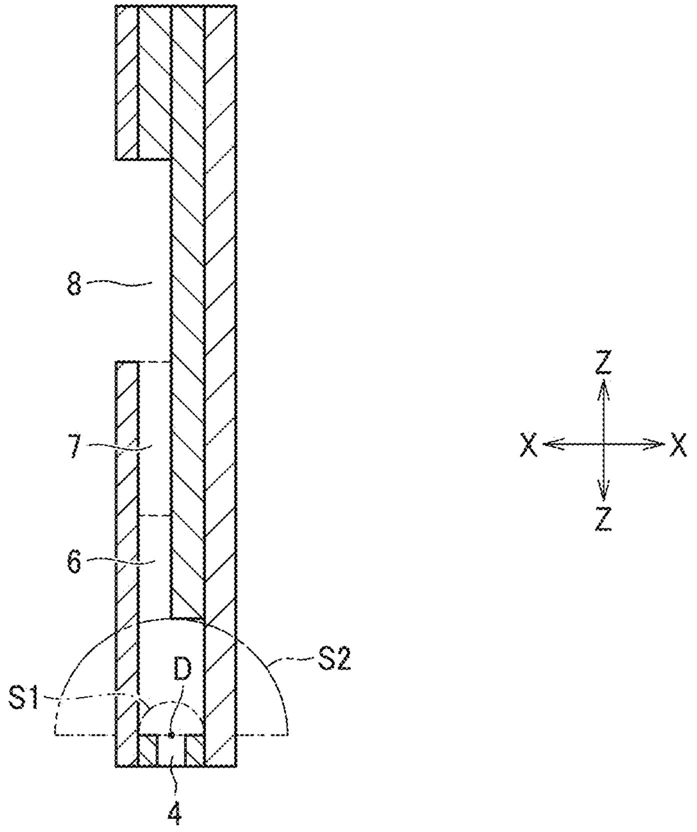
FIG. 9 is a cross-sectional view illustrating a liquid discharge head of an embodiment in which an opening direction of a nozzle hole and the like is different.

In the above-described embodiment, a case where the longitudinal direction of the pressure chamber 6 is orthogonal to the vertical direction and the nozzle array direction has been described, but the present embodiment is not limited thereto. For example, as illustrated in FIG. 9, the longitudinal direction Z of the pressure chamber 6 of the present embodiment is the same direction as the vertical direction and the ink discharge direction from the nozzle hole 4. The longitudinal direction Z is a direction orthogonal to the array direction Y of the nozzle holes 4.

Also in the present embodiment, as in the above-described embodiment, a length with which a distance to any surface of the pressure chamber 6 is the shortest is set to a radius $r_{min}$, and a length with which a distance to any surface of the pressure chamber 6 is the longest is set to a radius $r_{max}$ in a total of five directions including an upward direction in FIG. 9 being a direction opposite to the liquid discharge direction from the nozzle hole 4 from the spherical center D, both directions in the Y direction being the nozzle array direction from the spherical center D, and both directions in the X direction orthogonal to the directions from the spherical center D. The virtual hemisphere S1 and the virtual hemisphere S2 are set by the radius $r_{min}$ and the radius $r_{max}$, the volume $V_{min}$ of the virtual hemisphere S1 is set to $5\times10^5$ $\mu m^3$ or more and $5\times10^6$ $\mu m^3$ or less, and the volume $V_{max}$ of the virtual hemisphere S2 is set to five times or more and less than 1000 times the volume $V_{min}$ of the virtual hemisphere S1. As a result, it is possible to suppress the meniscus resonance period to a certain value or less while suppressing drying and thickening due to drying of the ink in the pressure chamber, and the liquid discharge head may support high-speed discharge.

In the liquid discharge head 100 in the above-described embodiment, it is preferable to use aqueous pigment ink. In the liquid discharge head 100 in the above-described embodiment, it is preferable to use quick-drying ink. These inks are easily thickened and dried, and the nozzle hole is easily clogged. However, the configuration of the pressure chamber of the present embodiment may effectively suppress clogging of the nozzle hole. The aqueous pigment ink referred to herein is ink containing at least water, an organic solvent, and pigment.

The content of water in ink is not particularly limited, and may be appropriately selected according to the purpose, but is preferably from 10% to 90% by mass, and more preferably from 20% to 60% by mass from the viewpoint of drying property and discharge reliability of ink.

The organic solvent contained in ink is not particularly limited, and a water-soluble organic solvent may be used. Examples of water-soluble organic solvents include polyols, ethers (e.g., polyol alkyl ethers and polyol aryl ethers), nitrogen-containing heterocyclic compounds, amides, amines, and sulfur-containing compounds.

Specific examples of the water-soluble organic solvent include polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N, N-dimethylformamide, 3-methoxy-N, N-dimethylpropionamide, and 3-butoxy-N, N-dimethylpropionamide; amines such as monoethanolamine, diethanolamine, and triethylamine; sulfur-containing compounds such as dimethyl sulfoxide, sulfolane, and thiodiethanol, propylene carbonate, ethylene carbonate, and the like, for example.

In particular, organic solvents having a boiling point of 250° C. or less are preferred, since they not only function as a wetting agent but also provide good drying property.

The proportion of the organic solvent in the ink is not particularly limited and can be appropriately selected to suit to a particular application, but is preferably from 10% to 60% by mass, more preferably from 20% to 60% by mass, for drying property and discharge reliability of the ink.

As the pigment contained in the ink, an inorganic pigment or an organic pigment may be used. Each of the pigments may be used alone or two or more of the pigments may be used in combination. Mixed crystals can also be used as the colorant. Usable pigments include, but are not limited to, black pigments, yellow pigments, magenta pigments, cyan pigments, white pigments, green pigments, orange pigments, glossy color pigments (e.g., gold pigments and silver pigments), and metallic pigments.

Specific examples of inorganic pigments include, but are not limited to, titanium oxide, iron oxide, calcium carbonate, barium sulfate, aluminum hydroxide, Barium Yellow, Cadmium Red, Chrome Yellow, and carbon black produced by a known method such as a contact method, a furnace method, and a thermal method.

Specific examples of organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black. Among these pigments, the pigments having good affinity for solvents are preferable. In addition, hollow resin particles and hollow inorganic particles can also be used.

Specific examples of the pigment include, for black, carbon blacks (C.I. pigment black 7) such as furnace black, lamp black, acetylene black, and channel black, metals such as copper, iron (C.I. Pigment Black 11), and titanium oxide, or organic pigment such as aniline black (C.I. Pigment Black 1).

For color, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, 213, C.I. Pigment Orange 5, 13, 16, 17, 36, 43, 51, C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, 264, C.I. Pigment Violet 1 (rhodamine lake), 3, 5:1, 16, 19, 23, 38, C.I. Pigment Blue 1, 2, 15 (phthalocyanine blue), 15:1, 15:2, 15:3, 15:4 (phthalocyanine blue), 16, 17:1, 56, 60, 63, C.I. Pigment Green 1, 4, 7, 8, 10, 17, 18, 36 and the like.

The content of the pigment in the ink is preferably from 0.1% to 15% by mass, and more preferably from 1% to 10% by mass from the viewpoint of improvement in image density, excellent fixability, and discharge stability.

Figure 10:
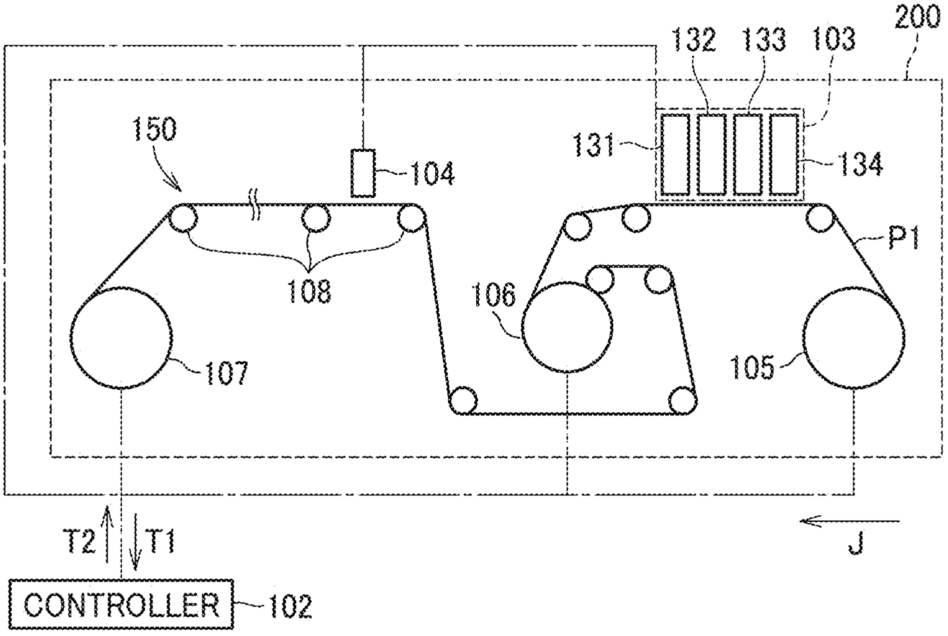
FIG. 10 is a schematic configuration diagram of an image forming apparatus.

FIG. 10 is a diagram illustrating an example of a configuration of an image forming apparatus 200, which is a liquid discharge apparatus including the liquid discharge head of the embodiment described above. The image forming apparatus 200 includes a controller 102, a head unit 103, an image inspector 104, an unwinder 105, a dryer 106, and a rewinder 107.

The image forming apparatus 200 discharges ink droplets onto sheet P1 to form an image. Here, the sheet P1 is an example of a recording medium, and is, for example, roll paper in the present embodiment. The ink is an example of a droplet. Note that a direction J in FIG. 10 is a direction orthogonal to a width direction of the sheet P1, and indicates a direction from a supply side to a discharge side of the sheet P1 in the image forming apparatus 200. The width direction is a direction orthogonal to a paper surface of FIG. 10.

The controller 102 is a control device that controls the image forming apparatus 200. The unwinder 105 and the rewinder 107 are synchronized by a control signal T1 output from the controller 102, and convey the sheet P1 at a predetermined speed. The unwinder 105, the rewinder 107, and multiple conveyance rollers 108 form a conveyor 150.

The head unit 103 includes a line head 131, a line head 132, a line head 133, and a line head 134. Each of the line heads 131 to 134 is an example of a droplet discharge head. The liquid discharge head according to the above-described embodiment is mounted on each of the line heads 131 to 134.

When the sheet P conveyed by the unwinder 105 and the rewinder 107 passes immediately below the head unit 103, each of the line heads 131, 132, 133, and 134 discharges ink based on image information, and applies the ink onto the sheet P1 to form an image. As an example, the line head 131 may discharge black ink, the line head 132 may discharge cyan ink, the line head 133 may discharge magenta ink, and the line head 134 may discharge yellow ink.

The dryer 106 is a heating drum that heats the ink applied onto the sheet P1 by the head unit 103 while conveying the sheet P1. The dryer 106 may evaporate liquid components such as moisture in the ink by heating, fix the ink onto the sheet P1, and fix the image onto the sheet P1.

The image inspector 104 reads the image fixed onto the sheet P1 and inspects the image. The controller 102 may receive a reception signal T2 including image inspection data and the like by the image inspector 104 and perform various pieces of correction processing using the image inspection data.

The image forming apparatus 200 may appropriately include other functional devices in addition to the configuration illustrated in FIG. 10. For example, a pretreatment device that performs pretreatment of image formation may be added between the unwinder 105 and the head unit 103, or a post-treatment device that performs post-treatment of image formation may be added between the dryer 106 and the rewinder 107. The pretreatment device includes a device that performs a treatment liquid application treatment of applying a treatment liquid that reacts with the ink and suppresses smearing to the sheet P1, but the content of the pretreatment is not particularly limited. The post-treatment device includes a cooler and the like that cools the sheet, but the content of the post-treatment is not particularly limited.

Figure 11:
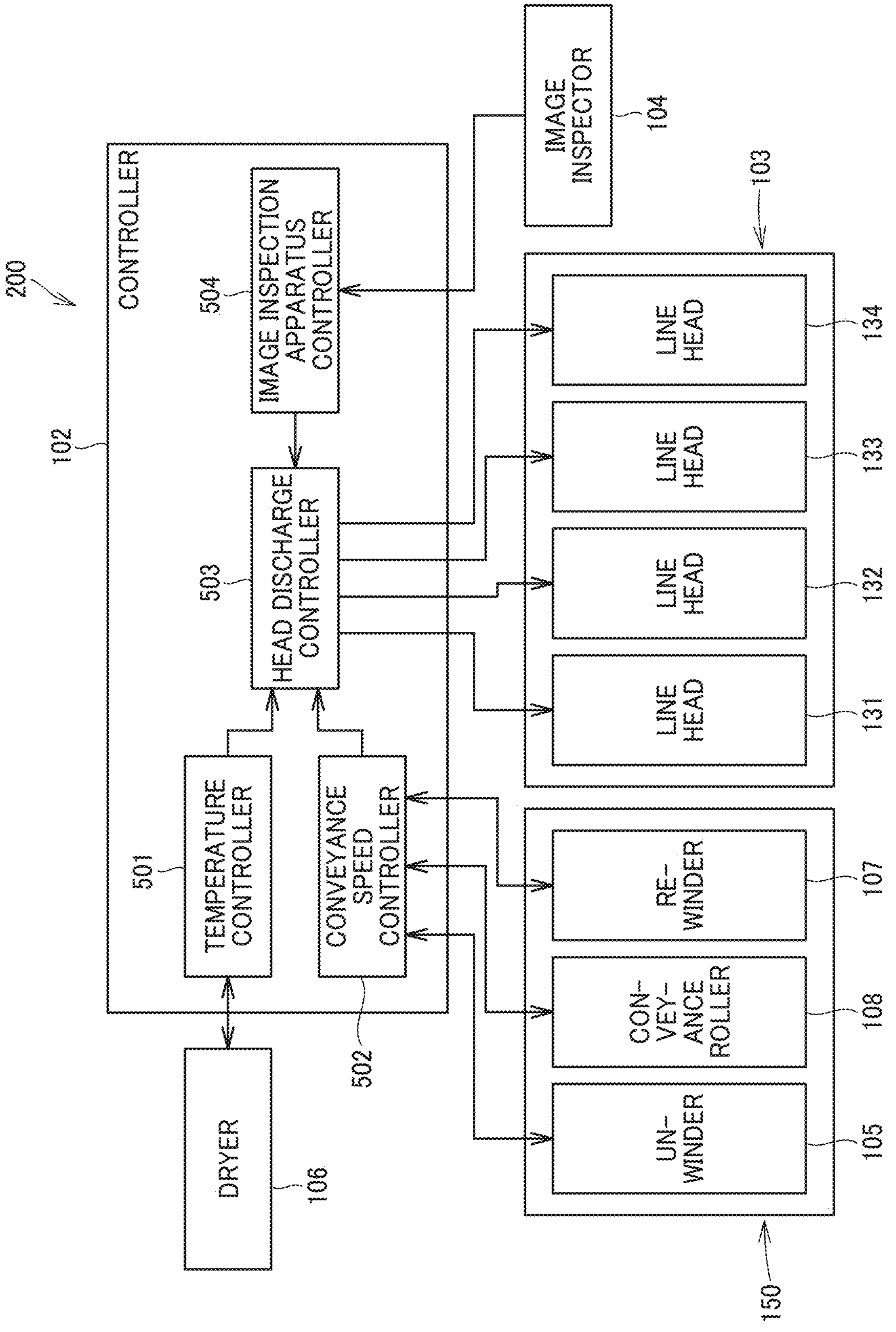
FIG. 11 is a block diagram illustrating functions of the image forming apparatus in FIG. 10.

A functional configuration of the controller 102 included in the image forming apparatus 200 will be described with reference to FIG. 11. FIG. 11 is a block diagram illustrating an example of the functional configuration of the controller 102.

As illustrated in FIG. 11, the controller 102 includes a temperature controller 501, a conveyance speed controller 502, a head discharge controller 503, and an image inspection apparatus controller 504. The controller 102 may implement these functions by a central processing unit (CPU) expanding a program stored in a read-only memory (ROM) or the like in a random-access memory (RAM) and executing the program.

The temperature controller 501 controls temperature of the dryer 106. The conveyance speed controller 502 is an example of a moving device that relatively moves the head unit 103 and the sheet in a conveyance direction. The conveyance speed controller 502 controls a conveyance speed by the conveyor 150 formed of the unwinder 105, the rewinder 107, the conveyance roller 108 and the like. The head discharge controller 503 outputs a driving voltage waveform to cause each of the line heads 131 to 134 to discharge ink. The image inspection apparatus controller 504 controls the image inspector 104.

When an image is formed, the temperature controller 501 starts temperature control so that the dryer 106 reaches desired temperature. The conveyance speed controller 502 starts conveying the sheet P1 to coincide with a timing at which the dryer 106 reaches the desired temperature and is ready for image formation. When the conveyance speed of the sheet P1 by the conveyance speed controller 502 becomes a substantially constant speed and the dryer 106 reaches a desired temperature range, the head discharge controller 503 outputs the driving voltage waveform to each of the line heads 131 to 134 of the head unit 103 to discharge ink. The image forming apparatus 200 may form an image on the sheet P1 with the ink discharged from each of the line heads 131 to 134.

An ink discharge timing by each of the line heads 131 to 134 is optimized in advance based on a landing position read by the image inspector 104 when forming an image for adjustment. It is possible to perform image inspection during image formation to adjust the ink discharge timing.

Figure 12:
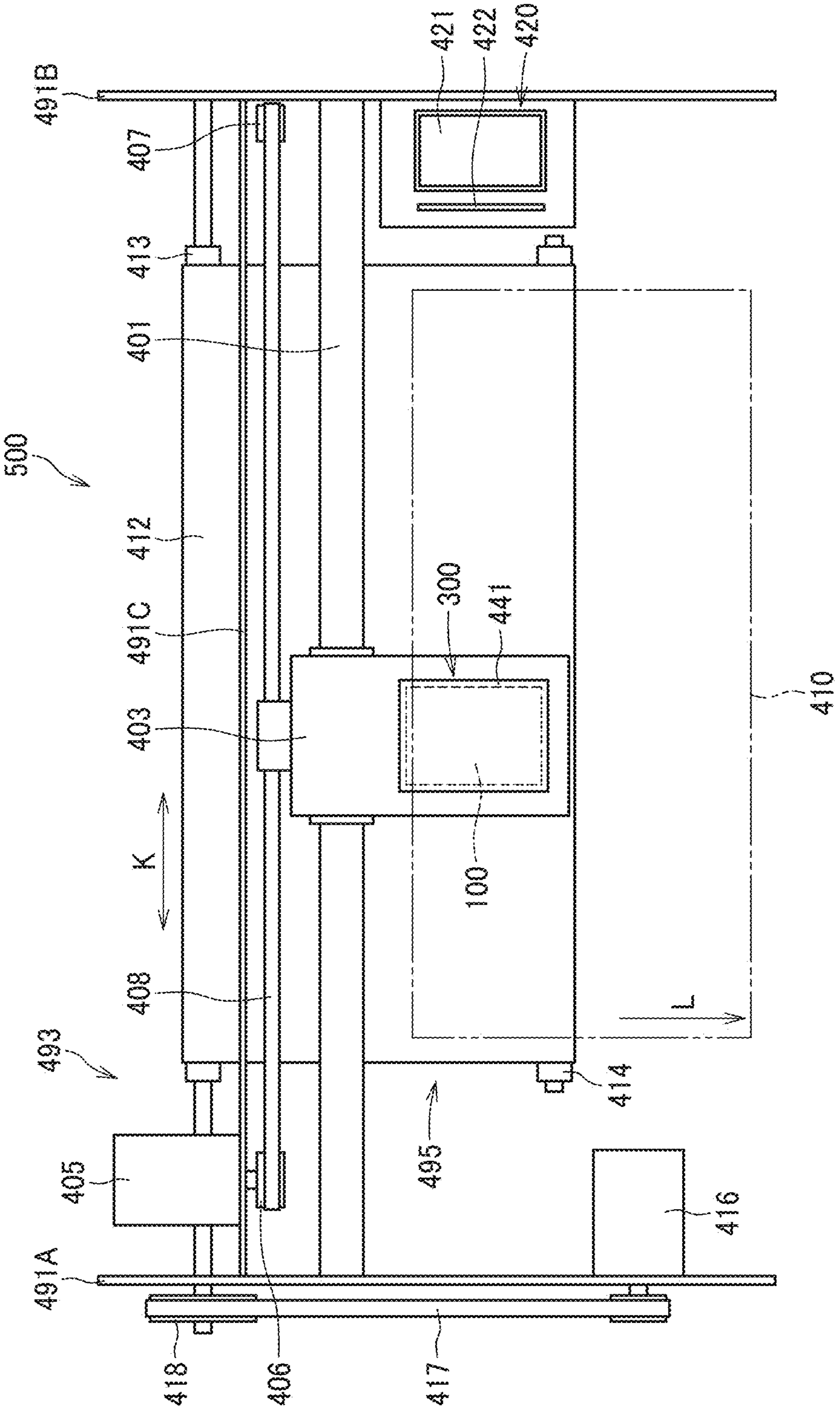
FIG. 12 is a plan view of a part of a printer of a different embodiment.
Figure 13:
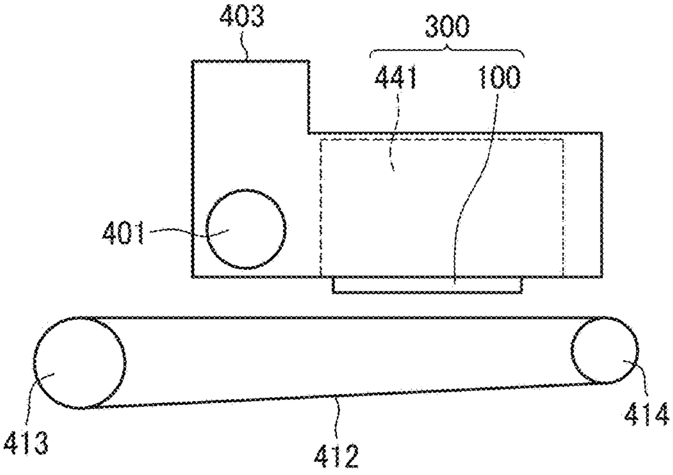
FIG. 13 is a side view of a part of a printer of a different embodiment.

Next, another example of a printer as the liquid discharge apparatus according to the present embodiment will be described with reference to FIGS. 12 and 13. FIG. 12 is a plan view of a part of a printer. FIG. 13 is a side view of the part of the printer.

A printer 500 is a serial type inkjet recording apparatus, and a carriage 403 is reciprocally moved in a main scanning direction K by a main scan moving unit 493. The main scan moving unit 493 includes a guide 401, a main scan motor 405, a timing belt 408, and the like. The guide 401 is bridged between a left-side plate 491A and a right-side plate 491B to moveably hold the carriage 403. The main scan motor 405 reciprocally moves the carriage 403 in the main scanning direction K via the timing belt 408 bridged between a drive pulley 406 and a driven pulley 407.

The carriage 403 mounts a liquid discharge device 300. The head 100 according to the present embodiment and a head tank 441 form the liquid discharge device 300 as a single unit. The head 100 of the liquid discharge device 300 discharges liquid of each color, for example, yellow (Y), cyan (C), magenta (M), and black (K). The head 100 includes a nozzle array including the nozzles arrayed in row in a sub scanning direction L perpendicular to the main scanning direction K. The head 100 is mounted to the carriage 403 so that liquid droplets (ink droplets) are discharged downward from the nozzles. The main scanning direction K is the direction X in the liquid discharge head described above, and the sub scanning direction L is the direction Y in the liquid discharge head described above.

The printer 500 includes a conveyor 495 to convey a sheet 410. The conveyor 495 includes a conveyance belt 412 as a conveyor and a sub scan motor 416 to drive the conveyance belt 412.

The conveyance belt 412 attracts the sheet 410 and conveys the sheet 410 at a position facing the head 100. The conveyance belt 412 is an endless belt stretched between a conveyance roller 413 and a tension roller 414. Attraction of the sheet 410 to the conveyance belt 412 may be applied by electrostatic attraction, air suction, or the like.

The conveyance belt 412 rotates in the sub scanning direction L as the conveyance roller 413 is rotationally driven by the sub scan motor 416 via a timing belt 417 and a timing pulley 418.

At one side in the main scanning direction K of the carriage 403, a maintenance unit 420 to maintain the head 100 in good condition is disposed on a lateral side of the conveyance belt 412.

The maintenance unit 420 includes, for example, a cap 421 to cap a nozzle surface (surface on which the nozzle is formed) of the head 100, a wiper 422 to wipe the nozzle surface, and the like.

The main scan moving unit 493, the maintenance unit 420, and the conveyor 495 are mounted to a housing that includes the left-side plate 491A, the right-side plate 491B, and a rear-side plate 491C.

In the printer 500 thus configured, the sheet 410 is conveyed on and attracted to the conveyance belt 412 and is conveyed in the sub scanning direction L by a cyclic rotation of the conveyance belt 412.

The head 100 is driven in response to image signals while the carriage 403 moves in the main scanning direction K, to discharge liquid to the sheet 410 stopped, thus forming an image on the sheet 410.

Figure 14:
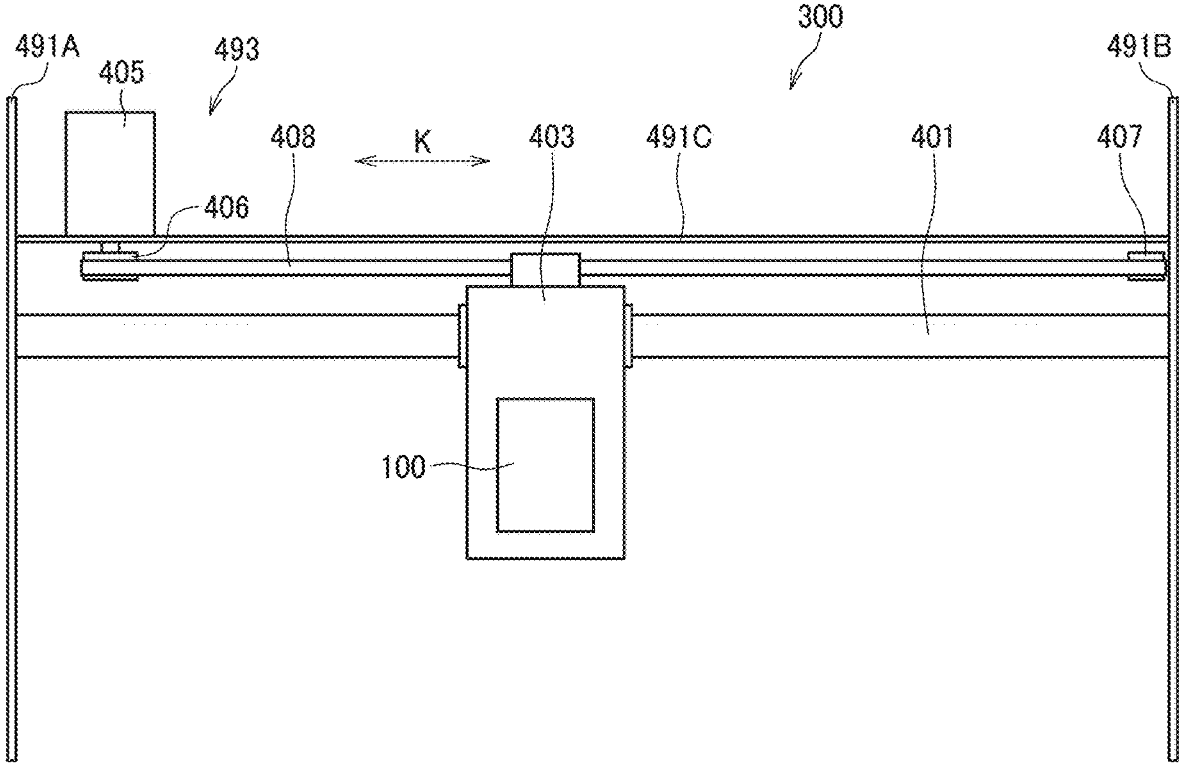
FIG. 14 is a plan view of a part of a liquid discharge device of a different embodiment.

Next, another example of the liquid discharge device 300 according to the present embodiment is described with reference to FIG. 14. FIG. 14 is a plan view of a part of the liquid discharge device 300.

The liquid discharge device 300 includes a housing, the main scan moving unit 493, the carriage 403, and the head 100 among components of the liquid discharge device 300. The left-side plate 491A, the right-side plate 491B, and the rear-side plate 491C configure the housing.

Note that, in the liquid discharge device 300, the maintenance unit 420 described above may be mounted on the right-side plate 491B, for example.

Figure 15:
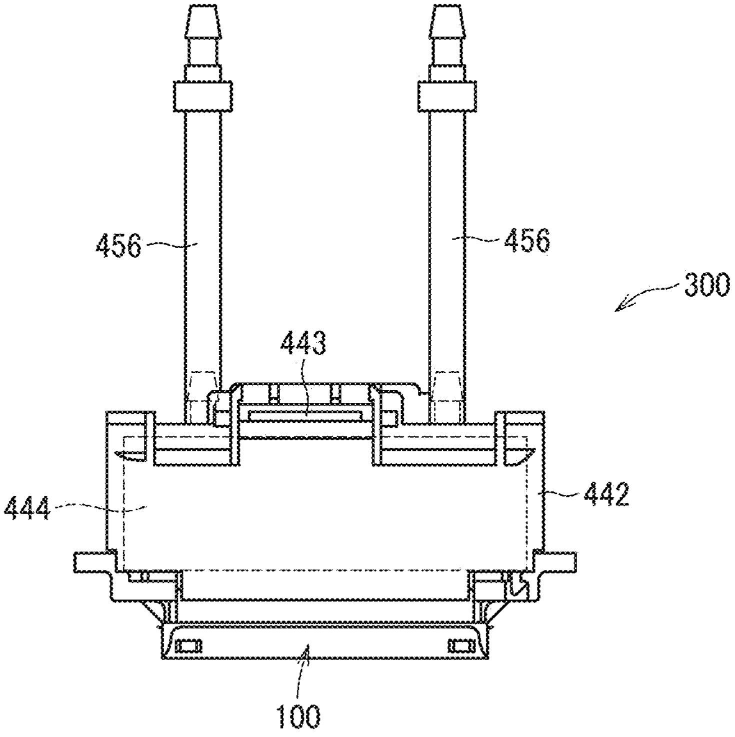
FIG. 15 is a front view of a part of a liquid discharge device of a different embodiment.

Next, still another example of the liquid discharge device 300 according to the present embodiment is described with reference to FIG. 15. FIG. 15 is a front view of still another example of the liquid discharge device 300.

The liquid discharge device 300 includes the head 100 to which a channel part 444 is attached, and a tube 456 connected to the channel part 444.

The channel part 444 is disposed inside a cover 442. The head tank 441 (refer to FIG. 13) may be included instead of the channel part 444. A connector 443 electrically connected with the head 100 is provided on an upper part of the channel part 444.

The liquid discharge device and the liquid discharge apparatus described above may also be provided with the liquid discharge head 100 described above. As a result, the meniscus resonance period may be suppressed to be small, and thickening and drying of ink in the nozzle hole and the vicinity thereof may be suppressed, and clogging of the nozzle hole may be suppressed.

In the present embodiment, discharged liquid is not limited to a particular liquid as long as the liquid has a viscosity or surface tension to be discharged from a head. However, preferably, the viscosity of the liquid is not greater than 30 mPa·s under ordinary temperature and ordinary pressure or by heating or cooling. Examples of the liquid include a solution, a suspension, or an emulsion that contains, for example, a solvent such as water and an organic solvent, a colorant such as dye and pigment, a functional material such as a polymerizable compound, a resin, and a surfactant, a biocompatible material such as deoxyribonucleic acid (DNA), amino acid, protein, and calcium, or an edible material such as a natural colorant. Such a solution, a suspension, and an emulsion are used for, e.g., inkjet ink, a surface treatment solution, a liquid for forming components of an electronic element and a light-emitting element or a resist pattern of an electronic circuit, or a material solution for three-dimensional fabrication.

Examples of an energy source to generate energy to discharge liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

The "liquid discharge device" is an assembly of parts relating to liquid discharge. The term "liquid discharge device" represents a structure including the head and a functional part(s) or unit(s) combined to the head to form a single unit. For example, the "liquid discharge device" includes a combination of the head with at least one of a head tank, a carriage, a supply unit, a maintenance unit, and a main scan moving unit to form a single unit.

Examples of the "single unit" include a combination in which the head and one or more functional parts and units are secured to each other through, e.g., fastening, bonding, or engaging, and a combination in which one of the head and the functional parts and units is movably held by another. The head may be detachably attached to the functional part(s) or unit(s) each other.

For example, the head and the head tank may form the liquid discharge device as a single unit. Alternatively, the head and the head tank coupled (connected) with a tube or the like may form the liquid discharge device as a single unit. A unit including a filter may be added at a position between the head tank and the head of the liquid discharge device.

In another example, the head and the carriage may form the liquid discharge device as a single unit.

In still another example, the liquid discharge device includes the head movably held by a guide that forms a part of a main scan moving unit, so that the head and the main scan moving unit form a single unit. The liquid discharge device may include the head, the carriage, and the main scan moving unit that form a single unit.

In still another example, a cap that forms a part of the maintenance unit may be secured to the carriage mounting the head so that the head, the carriage, and the maintenance unit form a single unit to form the liquid discharge device.

Further, in another example, the liquid discharge device includes a tube connected to the head mounting the head tank or the channel part so that the head and the supply unit form a single unit.

The main scan moving unit may be a guide only. The supply unit may be a tube(s) only or a loading unit only.

Although the present embodiment has been described above, the present embodiment is not limited to the above-described embodiment, and various modifications can be made without departing from the gist of the present embodiment.

"Liquid" includes not only ink but also paint.

In the present embodiment, the "liquid discharge apparatus" includes the head or the liquid discharge device and drives the head to discharge a liquid. The term "liquid discharge apparatus" used here includes, in addition to apparatuses to discharge liquid to materials onto which liquid can adhere, apparatuses to discharge the liquid into gas (air) or liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The term "liquid discharge apparatus" is not limited to an apparatus to discharge liquid to visualize meaningful images, such as letters or figures. For example, the liquid discharge apparatus may be an apparatus to form meaningless images, such as meaningless patterns, or fabricate three-dimensional images.

The above-described term "material onto which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid can adhere, unless particularly limited.

Examples of the "material onto which liquid can adhere" include any materials on which liquid can adhere even temporarily, such as paper, thread, fiber, fabric, leather, metal, plastic, glass, wood, and ceramic.

The "liquid discharge apparatus" may be an apparatus to relatively move the head and a material onto which liquid can adhere. However, the liquid discharge apparatus is not limited to such an apparatus. For example, the liquid discharge apparatus may be a serial head apparatus that moves the head or a line head apparatus that does not move the head.

Examples of the liquid discharge apparatus further include: a treatment liquid applying apparatus that discharges a treatment liquid onto a paper sheet to apply the treatment liquid to the surface of the paper sheet, for reforming the surface of the paper sheet; and an injection granulation apparatus that injects a composition liquid, in which a raw material is dispersed in a solution, through a nozzle to granulate fine particle of the raw material.

The terms "image formation", "recording", "printing", "image printing", and "fabricating" used herein may be used synonymously with each other.

Aspects of the present embodiment are, for example, as follows.

[Aspect 1]

A liquid discharge head including:

multiple nozzle holes which discharges a liquid; and a pressure chamber that communicates with the nozzle holes, in which, in a case where an intersection between a virtual center line of a nozzle hole and an extended surface of a surface on which an opening end of the nozzle hole is provided of the pressure chamber is set to a spherical center, a length with which a distance to any surface of the pressure chamber is shortest is set to a radius $r_{min}$ and a length with which a distance to any surface of the pressure chamber is longest is set to a radius rmax, in directions including a direction opposite to a liquid discharge direction from the nozzle hole, both directions in a nozzle array direction, and both directions orthogonal to the direction opposite to the liquid discharge direction from the nozzle hole and the nozzle array direction from the intersection, and a hemisphere with the spherical center as a center point and the radius $r_{min}$ is set to a virtual hemisphere S1 and a hemisphere with the spherical center as a center point and the radius $r_{max}$ is set to a virtual hemisphere S2, a volume $V_{min}$ of the virtual hemisphere S1 is $5\times10^5$ μm$^3$ or more and $5\times10^6$ μm$^3$ or less, and a volume $V_{max}$ of the virtual hemisphere S2 is five times or more and less than 1000 times the volume $V_{min}$.

[Aspect 2]

The liquid discharge head according to <1>, in which, in a case where a radius of the nozzle hole is set to r1, the radius $r_{min}$ is three times or more and less than seven times the radius r1, and the radius $r_{max}$ is five times or more and less than 60 times the radius r1.

[Aspect 3]

The liquid discharge head according to <1> or <2>, in which an area A of the surface on which the opening end of the nozzle hole is provided of the pressure chamber is $5\times10^4$ $\mu m^2$ or more and $2\times10^5$ $\mu m^2$ or less.

[Aspect 4]

The liquid discharge head according to any one of <1> to <3>, in which a volume V1 of the pressure chamber is 10 nl or less.

[Aspect 5]

The liquid discharge head according to any one of <1> to <4>, further including: a nozzle plate that forms the nozzle hole, in which the nozzle plate has a thickness of 25 μm or more and 45 μm or less.

[Aspect 6]

The liquid discharge head according to any one of <1> to <5>, in which an area of a cross section orthogonal to an extending direction of the nozzle hole is 300 $\mu m^2$ or more and 360 $\mu m^2$ or less.

[Aspect 7]

The liquid discharge head according to any one of <1> to <6>, a non-circulation type liquid discharge head in which liquid is not circulated.

[Aspect 8]

The liquid discharge head according to any one of <1> to <7>, in which the liquid is ink containing water, an organic solvent, and pigment.

[Aspect 9]

A liquid discharge apparatus including: the liquid discharge head according to any one of <1> to <8>.

[Aspect 10]

A liquid discharge head includes: a nozzle plate having multiple nozzle holes from which a liquid is to be discharged in a liquid discharge direction, the multiple nozzle holes arrayed in a nozzle array direction orthogonal to the liquid discharge direction; and a pressure chamber communicating with the multiple nozzle holes, wherein a volume $V_{min}$ of a virtual hemisphere S1 is $5\times10^5$ $\mu m^3$ or more and $5\times10^6$ $\mu m^3$ or less, and a volume $V_{max}$ of a virtual hemisphere S2 is five times or more and less than 1000 times the volume $V_{min}$, each of the multiple nozzle holes has a virtual center line, the nozzle plate has an inner surface defining a wall of the pressure chamber, the inner surface having multiple openings of each of the multiple nozzle holes, a spherical center is at an intersection between the virtual center line and an extension surface extended from the inner surface over the multiple openings, the pressure chamber has surfaces: in both directions in the nozzle array direction from the spherical center; in a direction opposite to the liquid discharge direction from the spherical center; and in both directions orthogonal to the nozzle array direction and orthogonal to the liquid discharge direction from the spherical center, and the virtual hemisphere S1 has a radius $r_{min}$ centered in the spherical center, the radius $r_{min}$ having the shortest length from the spherical center to any one of the surfaces of the pressure chamber, and the virtual hemisphere S2 has a radius $r_{max}$ centered in the spherical center, the radius $r_{max}$ having the longest length from the spherical center to any one of the surfaces of the pressure chamber.

[Aspect 11]

In the liquid discharge head according to aspect 10, each of the nozzle holes has a radius r1, the radius $r_{min}$ is three times or more and less than seven times the radius r1, and the radius $r_{max}$ is five times or more and less than 60 times the radius r1.

[Aspect 12]

In the liquid discharge head according to aspect 10, the inner surface has an area of $5\times10^4$ $\mu m^2$ or more and $2\times10^5$ $\mu m^2$ or less.

[Aspect 13]

In the liquid discharge head according to aspect 10, a volume of the pressure chamber is 10 nl or less.

[Aspect 14]

In the liquid discharge head according to aspect 10, the nozzle plate has a thickness of 25 μm or more and 45 μm or less.

[Aspect 15]

In the liquid discharge head according to aspect 10, each of the multiple nozzle holes has a cross sectional area of 300 $\mu m^2$ or more and 360 $\mu m^2$ or less in a direction orthogonal to the liquid discharge direction.

[Aspect 16]

In the liquid discharge head according to aspect 1, the liquid in the pressure chamber is not circulated and discharged from the multiple nozzle holes.

[Aspect 17]

In the liquid discharge head according to aspect 1, the liquid is ink containing water, an organic solvent, and pigment.

[Aspect 18]

A liquid discharge apparatus includes the liquid discharge head according to aspect 1; and a conveyor configured to convey a medium to the liquid discharge head. The liquid discharge head discharges the liquid onto the medium conveyed by the conveyor.

According to the present embodiment, it is possible to suppress the meniscus resonance period to be small and to suppress clogging of the nozzle hole.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate having multiple nozzle holes from which a liquid is to be discharged in a liquid discharge direction, the multiple nozzle holes arrayed in a nozzle array direction orthogonal to the liquid discharge direction; and a pressure chamber communicating with the multiple nozzle holes, wherein a volume $V_{min}$ of a virtual hemisphere S1 is $5\times10^5$ $\mu m^3$ or more and $5\times10^6$ μm; or less, and a volume $V_{max}$ of a virtual hemisphere S2 is five times or more and less than 1000 times the volume $V_{min}$, each of the multiple nozzle holes has a virtual center line, the nozzle plate has an inner surface defining a wall of the pressure chamber, the inner surface having multiple openings of each of the multiple nozzle holes, a spherical center is at an intersection between the virtual center line and an extension surface extended from the inner surface over the multiple openings, the pressure chamber has surfaces:

in both directions in the nozzle array direction from the spherical center;

in a direction opposite to the liquid discharge direction from the spherical center; and in both directions orthogonal to the nozzle array direction and orthogonal to the liquid discharge direction from the spherical center, and the virtual hemisphere S1 has a radius $r_{min}$ centered in the spherical center, the radius $r_{min}$ having the shortest length from the spherical center to any one of the surfaces of the pressure chamber, and the virtual hemisphere S2 has a radius $r_{max}$ centered in the spherical center, the radius $r_{max}$ having the longest length from the spherical center to any one of the surfaces of the pressure chamber.

2. The liquid discharge head according to claim 1, wherein, each of the nozzle holes has a radius r1, the radius $r_{min}$ is three times or more and less than seven times the radius r1, and the radius $r_{max}$ is five times or more and less than 60 times the radius r1.

3. The liquid discharge head according to claim 1, wherein the inner surface has an area of $5\times10^4$ μm$^2$ or more and $2\times10^5$ μm$^2$ or less.

4. The liquid discharge head according to claim 1, wherein a volume of the pressure chamber is 10 nl or less.

5. The liquid discharge head according to claim 1, wherein the nozzle plate has a thickness of 25 μm or more and 45 μm or less.

6. The liquid discharge head according to claim 1, wherein each of the multiple nozzle holes has a cross sectional area of 300 μm$^2$ or more and 360 μm$^2$ or less in a direction orthogonal to the liquid discharge direction.

7. The liquid discharge head according to claim 1, wherein the liquid in the pressure chamber is not circulated and discharged from the multiple nozzle holes.

8. The liquid discharge head according to claim 1, wherein the liquid is ink containing water, an organic solvent, and pigment.

9. A liquid discharge apparatus comprising:

the liquid discharge head according to claim 1; and a conveyor configured to convey a medium to the liquid discharge head, wherein the liquid discharge head discharges the liquid onto the medium conveyed by the conveyor.

* * * * *